(12) United States Patent
Risch et al.

(10) Patent No.: US 9,201,204 B2
(45) Date of Patent: Dec. 1, 2015

(54) OPTICAL-FIBER INTERCONNECT CABLE

(75) Inventors: Brian G. Risch, Granite Falls, NC (US); John C. Rosko, Apex, NC (US); Olivier Tatat, Sangatte (FR)

(73) Assignee: Draka Comteq, B.V., Amsterdam (NL)

(*) Notice: Subject to any disclaimer, the term of this patent is extended or adjusted under 35 U.S.C. 154(b) by 484 days.

(21) Appl. No.: 13/401,026

(22) Filed: Feb. 21, 2012

(65) Prior Publication Data
US 2012/0213483 A1 Aug. 23, 2012

Related U.S. Application Data

(60) Provisional application No. 61/444,960, filed on Feb. 21, 2011, provisional application No. 61/515,532, filed on Aug. 5, 2011.

(51) Int. Cl.
*G02B 6/44* (2006.01)

(52) U.S. Cl.
CPC ............... *G02B 6/44* (2013.01); *G02B 6/4401* (2013.01); *G02B 6/443* (2013.01); *G02B 6/4416* (2013.01); *G02B 6/4432* (2013.01); *G02B 6/4434* (2013.01); *G02B 6/4495* (2013.01)

(58) Field of Classification Search
CPC .... G02B 6/4401; G02B 6/443; G02B 6/4416; G02B 6/4495; G02B 6/44; G02B 6/4432; G02B 6/4434
USPC .......................... 385/100, 101, 109, 112, 113
See application file for complete search history.

(56) References Cited

U.S. PATENT DOCUMENTS

| 4,575,184 | A | | 3/1986 | Ueno et al. |
|---|---|---|---|---|
| 4,723,832 | A | | 2/1988 | Okazato et al. |
| 4,838,643 | A | | 6/1989 | Hodges et al. |
| 5,574,816 | A | | 11/1996 | Yang et al. |
| 5,651,081 | A | | 7/1997 | Blew et al. |
| 5,717,805 | A | | 2/1998 | Stulpin |
| 5,761,362 | A | | 6/1998 | Yang et al. |
| 5,911,023 | A | | 6/1999 | Risch et al. |
| 5,982,968 | A | | 11/1999 | Stulpin |
| 6,035,087 | A | * | 3/2000 | Bonicel et al. ................. 385/109 |
| 6,066,397 | A | | 5/2000 | Risch et al. |
| 6,085,009 | A | | 7/2000 | Risch et al. |
| 6,134,363 | A | | 10/2000 | Hinson et al. |

(Continued)

FOREIGN PATENT DOCUMENTS

| DE | 9302981 | 4/1993 |
|---|---|---|
| EP | 1921478 A1 | 5/2008 |

(Continued)

OTHER PUBLICATIONS

International Preliminary Report on Patentability in counterpart International Application No. PCT/US2012/025918, dated Aug. 29, 2013, pp. 1-6.

(Continued)

*Primary Examiner* — Ryan Lepisto
*Assistant Examiner* — Mary El Shammaa
(74) *Attorney, Agent, or Firm* — Additon, Higgins & Pendleton, P.A.

(57) ABSTRACT

An optical-fiber interconnect cable includes one or more optical fibers and one or more electrical conductors surrounded by an outer jacket. The optical fibers, such as multimode optical fibers, are typically enclosed within a flexible polymeric tube to form a flexible subunit.

25 Claims, 3 Drawing Sheets

(56) References Cited

U.S. PATENT DOCUMENTS

| | | |
|---|---|---|
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,289,704 B1 * | 10/2007 | Wagman et al. ............ 385/100 |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,483,613 B2 | 1/2009 | Bigot-Astruc et al. |
| 7,515,795 B2 | 4/2009 | Overton et al. |
| 7,526,177 B2 | 4/2009 | Matthijsse et al. |
| 7,537,489 B2 | 5/2009 | Iranpour Feridani et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,702,204 B2 | 4/2010 | Gonnet et al. |
| 7,724,998 B2 | 5/2010 | Parris et al. |
| 7,749,028 B2 | 7/2010 | Iranpour Feridani et al. |
| 7,794,284 B1 | 9/2010 | He et al. |
| 7,798,726 B2 | 9/2010 | Sabo |
| 7,817,891 B2 | 10/2010 | Lavenne et al. |
| 7,841,904 B2 | 11/2010 | Lin et al. |
| 7,878,712 B2 | 2/2011 | Shimotakahara et al. |
| 7,889,960 B2 | 2/2011 | de Montmorillon et al. |
| 7,903,918 B1 | 3/2011 | Bickham et al. |
| 7,970,247 B2 | 6/2011 | Barker |
| 7,974,507 B2 | 7/2011 | Lovie et al. |
| 7,995,888 B2 | 8/2011 | Gholami et al. |
| 8,009,950 B2 | 8/2011 | Molin et al. |
| 8,031,997 B2 | 10/2011 | Overton |
| 8,041,167 B2 | 10/2011 | Overton |
| 8,041,168 B2 | 10/2011 | Overton |
| 8,041,172 B2 | 10/2011 | Sillard et al. |
| 8,055,111 B2 | 11/2011 | Sillard et al. |
| 8,081,853 B2 | 12/2011 | Overton |
| 8,189,978 B1 | 5/2012 | Bennett et al. |
| 2003/0202758 A1 * | 10/2003 | Ardouin ................ 385/111 |
| 2005/0141831 A1 * | 6/2005 | Bocanegra et al. ........... 385/100 |
| 2008/0292262 A1 | 11/2008 | Overton et al. |
| 2009/0175583 A1 | 7/2009 | Overton |
| 2009/0214167 A1 | 8/2009 | Lookadoo et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0067855 A1 * | 3/2010 | Barker .................. 385/109 |
| 2010/0080519 A1 | 4/2010 | Ko et al. |
| 2010/0092135 A1 | 4/2010 | Barker et al. |
| 2010/0092138 A1 | 4/2010 | Overton |
| 2010/0092140 A1 * | 4/2010 | Overton ................ 385/112 |
| 2010/0118388 A1 | 5/2010 | Pastouret et al. |
| 2010/0119202 A1 | 5/2010 | Overton |
| 2010/0124395 A1 | 5/2010 | Lin et al. |
| 2010/0135624 A1 | 6/2010 | Overton et al. |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0158448 A1 | 6/2010 | Yi et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0220966 A1 | 9/2010 | Bennett |
| 2010/0226612 A1 | 9/2010 | Sedio et al. |
| 2010/0254661 A1 | 10/2010 | Sun et al. |
| 2010/0254662 A1 | 10/2010 | He et al. |
| 2010/0278490 A1 | 11/2010 | Liao et al. |
| 2010/0290743 A1 | 11/2010 | Liao et al. |
| 2010/0290745 A1 | 11/2010 | Liao et al. |
| 2010/0303420 A1 | 12/2010 | Lin et al. |
| 2010/0310218 A1 | 12/2010 | Molin et al. |
| 2010/0322572 A1 * | 12/2010 | Sakabe et al. ............... 385/100 |
| 2011/0013872 A1 | 1/2011 | Zhang et al. |
| 2011/0026889 A1 | 2/2011 | Risch et al. |
| 2011/0044592 A1 | 2/2011 | Tseng |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0085766 A1 | 4/2011 | Liao et al. |
| 2011/0085772 A1 | 4/2011 | Benjamin et al. |
| 2011/0091160 A1 | 4/2011 | He et al. |
| 2011/0091161 A1 | 4/2011 | He et al. |
| 2011/0091171 A1 | 4/2011 | Tatat et al. |
| 2011/0097040 A1 | 4/2011 | Lin et al. |
| 2011/0097041 A1 | 4/2011 | Liao et al. |
| 2011/0097042 A1 | 4/2011 | Liao et al. |
| 2011/0097043 A1 | 4/2011 | He et al. |
| 2011/0103752 A1 | 5/2011 | Little et al. |
| 2011/0116160 A1 | 5/2011 | Boivin et al. |
| 2011/0123144 A1 | 5/2011 | Wang et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0142399 A1 | 6/2011 | Little et al. |
| 2011/0142400 A1 | 6/2011 | Little et al. |
| 2011/0150397 A1 | 6/2011 | Yi et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2011/0305420 A1 | 12/2011 | Bickham et al. |
| 2012/0009358 A1 | 1/2012 | Gharbi et al. |
| 2012/0014652 A1 | 1/2012 | Parris |
| 2012/0040105 A1 | 2/2012 | Overton |
| 2012/0040184 A1 | 2/2012 | de Montmorillon et al. |
| 2012/0051703 A1 | 3/2012 | Bigot-Astruc et al. |
| 2012/0057833 A1 | 3/2012 | Tatat |
| 2012/0092651 A1 | 4/2012 | Molin et al. |
| 2012/0134376 A1 | 5/2012 | Burov et al. |
| 2012/0148206 A1 | 6/2012 | Boivin et al. |
| 2012/0195549 A1 | 8/2012 | Molin et al. |
| 2012/0195561 A1 | 8/2012 | Molin et al. |
| 2012/0213483 A1 * | 8/2012 | Risch et al. ................. 385/113 |

FOREIGN PATENT DOCUMENTS

| | | |
|---|---|---|
| GB | 2177231 A | 1/1987 |
| JP | 2006-047719 A | 2/2006 |

(56) References Cited

FOREIGN PATENT DOCUMENTS

| WO | 01/80025 A1 | 10/2001 |
|---|---|---|
| WO | 2008/121731 A1 | 10/2008 |
| WO | 2009/050544 A1 | 4/2009 |
| WO | 2009/062131 A1 | 5/2009 |
| WO | 2010/036684 A2 | 4/2010 |
| WO | 2010/039591 A2 | 4/2010 |
| WO | 2010/093888 A2 | 8/2010 |
| WO | 2011/034544 A1 | 3/2011 |
| WO | 2011/046891 A1 | 4/2011 |

OTHER PUBLICATIONS

Draka, product sheet for "Graded-Index Multimode Fiber for opto-electronic applications", May 2011, pp. 1-2.

International Search Report and Written Opinion in counterpart International Application No. PCT/US2012/025918, dated Jun. 21, 2012, pp. 1-10.

U.S. Appl. No. 61/511,672 for "Multimode Optical Fiber with Improved Bend Resistance", filed Jul. 26, 2011, pp. 1-47.

* cited by examiner

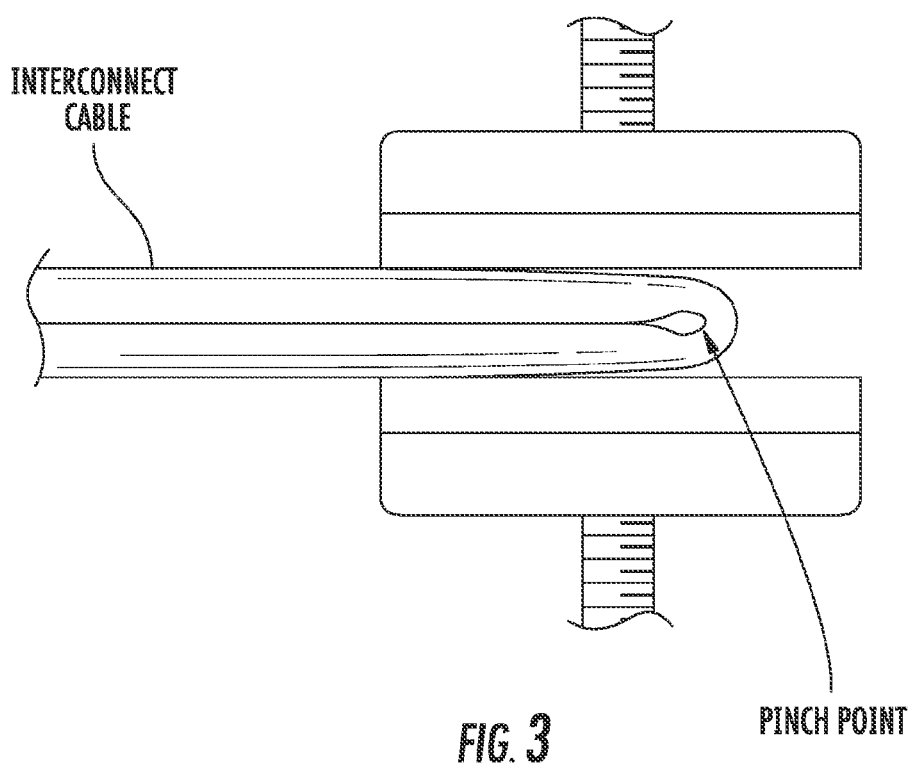

OPTICAL-FIBER INTERCONNECT CABLE

CROSS-REFERENCE TO PRIORITY APPLICATIONS

This U.S. nonprovisional application claims the benefit of U.S. Patent Application Ser. No. 61/444,960 for an Optical-Fiber Interconnect Cable (filed Feb. 21, 2011) and U.S. Patent Application Ser. No. 61/515,532 for an Optical-Fiber Interconnect Cable (filed Aug. 5, 2011), each of which is hereby incorporated by reference in its entirety.

FIELD OF INVENTION

The present invention relates to optical-fiber interconnect cables.

BACKGROUND

As compared with traditional wire-based networks, optical-fiber communication networks are capable of transmitting significantly more information at significantly higher speeds. Optical fibers, therefore, are being increasingly employed in communication networks. Optical data-transmission elements are also being increasingly integrated into computers, computer systems, and other electronic devices.

Various kinds of interconnect cables, such as USB cables, have been used to connect computers to peripheral devices. Conventional interconnect cables, however, do not support optical data transmission.

With the expansion of optical communications into and between computers and peripheral devices, a need exists for an optical-fiber interconnect cable that can facilitate optical data transmission.

SUMMARY

In one aspect, the present invention embraces an optical fiber interconnect cable. The interconnect cable typically includes a flexible subunit, which typically has one or more optical fibers (e.g., multimode fibers) enclosed within a flexible polymeric tube. The flexible polymeric tube typically has a Young's modulus of less than about 100 MPa. The interconnect cable typically includes one or more high-conductivity conductors. An outer jacket surrounds the flexible subunit and the high-conductivity conductors. The outer jacket typically has a Young's modulus of less than about 150 MPa.

BRIEF DESCRIPTION OF THE DRAWING

FIG. 3 is a photograph depicting an interconnect cable undergoing the pinch test in accordance with the present invention.

DETAILED DESCRIPTION

In one aspect, the present invention embraces an optical-fiber interconnect cable.

Figure 1:
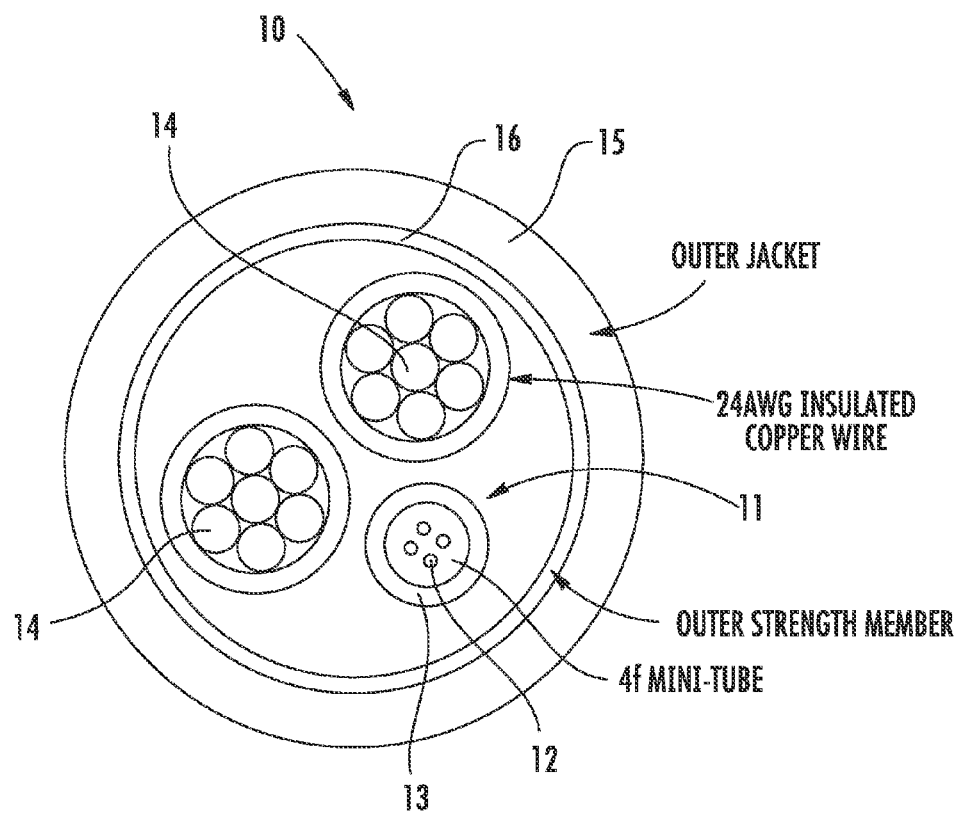
FIG. 1 schematically depicts a cross-sectional view of an optical-fiber interconnect cable in accordance with the present invention.

In this regard, FIG. 1 depicts an exemplary optical-fiber interconnect cable 10 in accordance with the present invention. The optical-fiber interconnect cable 10 typically includes at least one flexible subunit 11 (e.g., a flextube), which usually has one or more (e.g., two to four) optical fibers 12 surrounded by a flexible polymeric tube 13 (i.e., a flextube). For instance, the flexible subunit 11 may include at least six optical fibers 12 (e.g., twelve optical fibers) surrounded by a flexible polymeric tube 13.

Typically, the optical-fiber interconnect cable 10 also includes one or more insulated high-conductivity conductors 14 (e.g., electrical conductors). As depicted in FIG. 1, an outer jacket 15 typically encloses the flexible subunit 11 and the insulated high-conductivity conductors 14. In some embodiments, the optical-fiber interconnect cable 10 may also have a strength member 16 (e.g., strength yarns positioned within the outer jacket's central space).

In this regard, an exemplary optical-fiber interconnect cable according to the present invention typically employs high-conductivity conductors (e.g., electrical conductors), optical conductors, and strength yarns to achieve a dry filled core. In a typical embodiment, the strength yarns mostly fill the free space around the electrical conductors and flexible subunits that enclose optical conductors (i.e., the portion of the outer jacket's central space not otherwise occupied by the electrical conductors and the optical conductors). More typically, along the length of an optical-fiber interconnect cable, the strength yarns substantially fill the free space around the electrical conductors and flexible subunits that enclose optical conductors.

Those having ordinary skill in the art will appreciate that the concept of strength yarns filling free space within the outer jacket's central space is not intended to mean that substantially no voids exists between adjacent strength yarns. Rather, this concept is intended to convey the idea that the strength yarns are more or less present in the form of a fiberfill.

Figure 2:
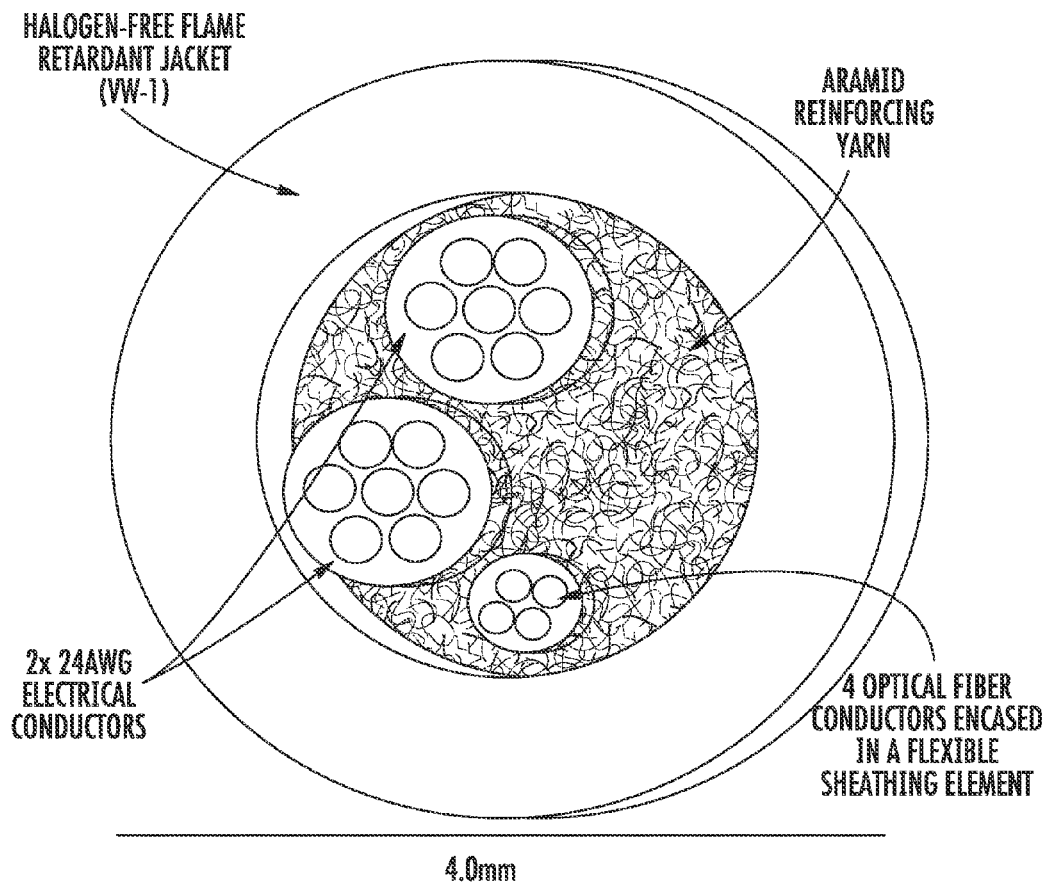
FIG. 2 is a photograph of an exemplary, prototypical optical-fiber interconnect cable in accordance with the present invention.

FIG. 2, which is a photograph depicting a prototypical optical-fiber interconnect cable according to the present invention, illustrates this concept (e.g., longitudinal strength yarns substantially filling the free space around the electrical conductors and the flexible sheathing element, which encloses optical conductors). In particular, the strength yarns shown in FIG. 2 not only improve the cable's tensile strength and crush resistance, but also provide lateral protection for the optical conductors (e.g., by limiting the lateral movement of the flexible subunit).

The optical-fiber interconnect cable 10 is typically designed so that the bending radius is self-limiting in order to prevent violation of the minimum optical-fiber bending radius (i.e., the minimum bending radius possessed by the constituent optical fibers). For example, the constituent components of the interconnect cable (e.g., the electrical conductors and surrounding outer jacket) may enhance the cable's mechanical properties, thereby preventing excessive bending of the optical-fiber interconnect cable that might cause undesirable optical attenuation. Indeed, mechanical properties of the cable can be modified to achieve desirable self-limiting bending characteristics. Exemplary mechanical properties include, without limitation, (i) cable thickness (e.g., diameter), (ii) cable stiffness, and (iii) fill ratio of the cable core. As will be appreciated by those having ordinary skill in the art, the characteristics of the cable's constituent elements will determine the resulting bending properties of the optical-fiber interconnect cable.

As noted, the optical-fiber interconnect cable 10 typically includes at least one flexible subunit 11. In an exemplary embodiment, the flexible subunit 11 includes one or more multimode optical fibers (e.g., conventional optical multimode fibers with a 50-micron core, such as OM2 multimode fibers, that comply with the ITU-T G.651.1 recommendations). The ITU-T G.651.1 recommendations (July 2007) are hereby incorporated by reference in its entirety. Exemplary multimode optical fibers that may be employed include Max-Cap™ multimode optical fibers (OM2+, OM3, or OM4) commercially available from Draka (Claremont, N.C.).

By way of further example, the flexible subunit 11 may include bend-insensitive multimode optical fibers, such as MaxCap™-BB-OMx multimode optical fibers commercially available from Draka (Claremont, N.C.). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, in accordance with the ITU-T G.651.1 recommendations, standard multimode optical fibers, have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, such standard multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

Multimode optical fibers are advantageous, because their relatively large core diameter facilitates easy connectorization. Accordingly, it is within the scope of the present invention to employ multimode optical fibers having enlarged core diameters (e.g., 62.5 microns or greater), such as between about 70 microns and 100 microns (e.g., about 80 microns). An exemplary multimode optical fiber having an enlarged core diameter is disclosed in commonly assigned U.S. Patent Application No. 61/511,672 for a Multimode Optical Fiber with Improved Bend Resistance, filed Jul. 26, 2011, (Molin et al.), which is hereby incorporated by reference in its entirety. In particular, U.S. Patent Application No. 61/511,672 discloses a trench-assisted multimode optical fiber having improved bend resistance. Another exemplary multimode optical fiber having an enlarged core diameter is disclosed in U.S. Patent Application Publication No. 2010/0220966 A1, which is hereby incorporated by reference in its entirety.

To supplement the present disclosure, this application incorporates entirely by reference the following patents and patent application publications, which relate to optical fibers that might be employed in the present optical-fiber interconnect cable: U.S. Pat. No. 7,878,712; U.S. Pat. No. 7,903,918; U.S. Patent Application Publication No. 2011/0085772; International Publication No. WO 2010/036684; and International Publication No. WO 2011/046891.

In an alternative embodiment, the flexible subunit 11 includes a plurality of conventional standard single-mode fibers (SSMF). Suitable single-mode optical fibers (e.g., enhanced single-mode fibers (ESMF)) that are compliant with the ITU-T G.652.D recommendations are commercially available, for instance, from Draka (Claremont, N.C.). The ITU-T G.652 recommendations (November 2009) and each of its attributes (i.e., A, B, C, and D) are hereby incorporated by reference in their entirety.

In yet another alternative embodiment, the flexible subunit 11 includes a plurality of bend-insensitive single-mode optical fibers. Bend-insensitive single-mode optical fibers, which are less susceptible to attenuation (e.g., caused by microbending or macrobending), are commercially available from Draka (Claremont, N.C.) under the trade name BendBright®. BendBright® optical fibers are compliant with the ITU-T G.652.D recommendations. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). The ITU-T G.657.A/B recommendations are hereby incorporated by reference in their entirety.

In this regard, particularly outstanding bend-insensitive single-mode glass fibers for use in the present invention are commercially available from Draka (Claremont, N.C.) under the trade name BendBrightXS®. BendBrightXS® optical fibers are not only compliant with both the ITU-T G.652.D and ITU-T G.657.A/B recommendations but also demonstrate significant improvement with respect to both macrobending and microbending. As compared with such bend-insensitive single-mode optical fibers, conventional single-mode optical fibers typically do not comply with either the ITU-T G.657.A recommendations or the ITU-T G.657.B recommendations, but do typically comply with the ITU-T G.652 recommendations (e.g., the ITU-T G.652.D recommendations).

As set forth in commonly assigned International Patent Application Publication No. WO 2009/062131 A1 for a Microbend Resistant Optical Fiber and U.S. Patent Application Publication No. US 2009/0175583 for a Microbend-Resistant Optical Fiber, pairing a bend-insensitive glass fiber (e.g., Draka's single-mode glass fibers available under the trade name BendBrightXS®) and a primary coating having very low modulus achieves optical fibers having exceptionally low losses (e.g., reductions in microbend sensitivity of at least 10× as compared with a single-mode fiber employing a conventional coating system). Each of these patent publications is hereby incorporated by reference in its entirety.

The optical fibers deployed in the flexible subunit 11 may employ the optical-fiber coatings disclosed in International Patent Application Publication No. WO 2009/062131 A1 and U.S. Patent Application Publication No. US 2009/0175583 with either single-mode optical fibers or multimode optical fibers.

Optical fibers typically have an outer diameter of between about 235 microns and 265 microns, although the use of optical fibers having smaller diameters is within the scope of the present invention.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns) and the secondary coating may have an outer diameter of between about 235 microns and 265 microns (i.e., a secondary coating thickness of between about 20 microns and 45 microns). At least one of the coating layers—typically the secondary coating—may be colored and/or possess other markings to help identify individual fibers. Optionally, the optical fiber may include an outermost ink layer, which is typically between two and ten microns.

In one alternative embodiment, an optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns.

By way of example, in such exemplary embodiments the primary coating layer may have an outer diameter of between about 135 microns and about 175 microns (e.g., about 160 microns), typically less than 165 microns (e.g., between about 135 microns and 150 microns) and usually more than 140 microns (e.g., between about 145 microns and 155 microns, such as about 150 microns). Moreover, in such exemplary embodiments the secondary coating layer may have an outer diameter of between about 150 microns and about 230 microns (e.g., more than about 165 microns, such as 190-210 microns or so), typically between about 180 microns and 200 microns. In other words, the total diameter of the optical fiber is reduced to less than about 230 microns (e.g., between about 195 microns and 205 microns, and especially about 200 microns).

In another alternative embodiment, the diameter of the component glass fiber may be reduced to less than 125 microns (e.g., between about 60 microns and 120 microns), perhaps between about 70 microns and 115 microns (e.g., about 80-110 microns). This may be achieved, for instance, by reducing the thickness of one or more cladding layers. As compared with the prior alternative embodiment, (i) the total diameter of the optical fiber may be reduced (i.e., the thickness of the primary and secondary coatings are maintained in accordance with the prior alternative embodiment) or (ii) the respective thicknesses of the primary and/or secondary coatings may be increased relative to the prior alternative embodiment (e.g., such that the total diameter of the optical fiber might be maintained).

By way of illustration, with respect to the former, a component glass fiber having a diameter of between about 90 and 100 microns might be combined with a primary coating layer having an outer diameter of between about 110 microns and 150 microns (e.g., about 125 microns) and a secondary coating layer having an outer diameter of between about 130 microns and 190 microns (e.g., about 155 microns). With respect to the latter, a component glass fiber having a diameter of between about 90 and 100 microns might be combined with a primary coating layer having an outer diameter of between about 120 microns and 140 microns (e.g., about 130 microns) and a secondary coating layer having an outer diameter of between about 160 microns and 230 microns (e.g., about 195-200 microns).

FIG. 1 depicts the optical fibers 12 being enclosed within a flexible polymeric tube 13. The optical fibers 12 may be bundled or stranded within the flexible polymeric tube 13. Typically, the flexible polymeric tube 13 is formed from a polymeric material having a Young's modulus (e.g., at 25° C.) of less than about 300 megapascals (MPa), typically less than about 200 MPa (e.g., 50 MPa to 150 MPa), and more typically less than about 100 MPa. To achieve a Young's modulus less than about 100 MPa (e.g., less than about 80 MPa), the flexible polymeric tube 13 may be formed from a thermoplastic copolyester elastomer, such as Hytrel® HTR8351, which is commercially available from DuPont.

That said, other materials having a suitable Young's modulus may be employed. In this regard, the flexible polymeric tube 13 may be formed from Santoprene®, which is a mixture of EPDM rubber and polypropylene. Santoprene® is commercially available from Exxon Mobile.

Mechanical properties of suitable materials for the flexible polymeric tube (i.e., the flextube) are shown in Table 1 (below):

TABLE 1

| Material | Tensile Strength (MPa) | Percent Elongation | Modulus (MPa) |
| --- | --- | --- | --- |
| Santoprene 201-87 | 11 | 818 | 83 |
| Hytrel HTR8351NC020 | 10 | 160 | 25 |

By way of further example, the flexible polymeric tube 13 may be formed from a material having a Young's modulus of between about 10 MPa and 90 MPa (e.g., 25 MPa to 75 MPa). In some embodiments, the flexible polymeric tube 13 may be formed from a material having a Young's modulus greater than about 50 MPa. In other embodiments, the flexible polymeric tube 13 may be formed from a material having a Young's modulus less than 50 MPa (e.g., about 17 MPa), such as between about 20 MPa and 40 MPa (e.g., between about 25 MPa and 30 MPa).

The flexible polymeric tube 13 typically has an outer diameter of less than one millimeter. In a typical embodiment, the flexible polymeric tube has an inner diameter of about 600 microns and an outer diameter of about 800 microns.

The insulted, high-conductivity conductors 14 may be used to provide power to a device connected to the optical-fiber interconnect cable 10. In this regard, FIG. 1 depicts the optical-fiber interconnect cable 10 having two insulted high-conductivity conductors 14, which would typically be designated for $V_{BUS}$ and ground electrical connections. Typically, the conductors 14 are copper, although other high-conductivity metals (e.g., aluminum, silver, or gold) or metal alloys may be employed as an alternative to copper. Those having ordinary skill will appreciate that the high-conductivity conductors can be stranded or solid.

In an exemplary embodiment, each conductor 14 may be 24 AWG (America Wire Gauge) in size (i.e., having a cross-sectional area of 404 circular mils). That said, those of ordinary skill in the art will appreciate that the size of the high-conductivity conductors 14 will depend upon the desired current-carrying capacity of the interconnect cable 10. Indeed, because the current carrying capacity of the interconnect cable 10 depends upon the cross sectional area of the high-conductivity conductors 14, greater current-carrying capacity needs typically require larger diameter high-conductivity conductors. Additionally, as will be appreciated by those having ordinary skill in the art, the maximum specified distance for device power transfer is limited by the wire gauge of the high-conductivity conductors 14.

Each conductor 14 is typically insulated. Each conductor 14 may be insulated with a material such as LDPE or LLDPE insulation, a chemically cross-linked polyolefin, cross-linked polyethylene, halogen-free ethylene propylene rubber, a low-smoke halogen-free insulation compound, or polyvinyl chloride (PVC).

The high-conductivity conductors 14 may be stranded about each other to form a twisted pair. Moreover, the flexible subunit 11 may be stranded about the high-conductivity conductors 14 (e.g., stranded about a twisted pair of electrical conductors that are centrally positioned within the interconnect cable). This stranding can be accomplished helically in one direction, known as "S" or "Z" stranding, or via Reverse Oscillated Lay stranding, known as "S-Z" stranding. Stranding the flexible subunit about a centrally positioned twisted pair might reduce optical fiber strain when cable stress occurs during installation and use.

Alternatively, the flexible subunit 11 and/or the high-conductivity conductors 14 may be freely positioned within the interconnect cable 10. For example, the flexible subunit may not be intentionally stranded or arranged around a twisted pair in a particular manner, but rather may run substantially parallel to the electrical conductors or to the twisted pair.

It is within the scope of the present invention to position the high-conductivity conductors 14 within the cable's central space so as to define a preferential bending plane. For instance, the high-conductivity conductors 14 may be arranged diametrically opposite one another within the cable core (or even slightly off-axis with respect to the cable diameter) to facilitate the definition of a favored bending axis.

In one embodiment, the optical-fiber interconnect cable includes a strength member 16. The strength member 16 may include high-strength yarns (e.g., aramid yarns) positioned parallel or wrapped (e.g., contrahelically) around the flexible subunit 11 and the high-conductivity conductors 14. As will be understood by those having ordinary skill in the art, such strength yarns provide tensile strength and crush resistance to the interconnect cable.

The optical-fiber interconnect cable according to the present invention may include yarns, nonwovens, fabrics (e.g., tapes), foams, or other materials containing water-swellable material and/or coated with water-swellable materials (e.g., including super absorbent polymers (SAPs), such as SAP powder) to provide water blocking. For instance, the strength member 16 may include high-strength yarns that are coated with water-swellable material, such as SAP powder.

An outer jacket 15 encloses the flexible subunit 11, the high-conductivity conductors 14, and the strength member 16. Typically, the outer jacket 15 is formed predominately of polyolefin(s), such as polyethylene (e.g., LDPE, LLDPE, or HDPE) or polypropylene, including fluorinated polyolefins, polyesters (e.g., polybutylene terephthalate), polyamides (e.g., nylon), ethylene-vinyl acetate (EVA), polyvinyl chloride (PVC), as well as other polymeric materials and blends. The polymeric materials may include a curable composition (e.g., a UV-curable material) or a thermoplastic material, such as a low-smoke zero-halogen (LSZH) thermoplastic material.

In a more typical embodiment, the outer jacket 15 may be predominately formed from a halogen-free flame-retardant (HFFR) compound. For example, the outer jacket may be formed from ECCOH® 6638, which is commercially available from PolyOne Corporation. ECCOH® 6638 is a halogen-free flame-retardant (HFFR) compound that includes polyethylene, EVA, halogen-free flame retardants, and other additives. Other exemplary HFFR compounds include ECCOH® 6150, which is commercially available from PolyOne Corporation, and MEGOLON® HF 1876, MEGOLON® 5545, MEGOLON® 5380, and MEGOLON® HF 8142, which are commercially available from Alpha Gary Corporation.

Even more typically, the outer jacket 15 may be predominately formed from a low-modulus HFFR compound. A low-modulus HFFR compound typically has a Young's modulus (e.g., at 25° C.) of less than about 150 megapascals (MPa) (e.g., between about 50 MPa and 150 MPa), such as less than about 100 MPa (e.g., less than about 80 MPa). Exemplary low-modulus HFFR compounds include ECCOH® 5549 and ECCOH® 5924, which are commercially available from PolyOne Corporation. It has been found that low-modulus HFFR compounds demonstrate robust bend performance and minimal plastic deformation.

Accordingly, the polymeric materials used to form the outer jacket 15 may contain additives, such as nucleating agents, flame-retardants, smoke-retardants, antioxidants, UV absorbers, and/or plasticizers. For example, the outer jacket 15 may include a material that provides high temperature resistance and chemical resistance (e.g., an aromatic material or polysulfone material).

In this regard, the outer jacket 15 typically has a fire-resistance rating of at least about VW-1. In other words, the outer jacket typically is able to pass the UL VW-1 Vertical-Wire Flame Test (UL 1581), which is hereby incorporated by reference in its entirety. Moreover, the outer-jacket material may have a riser flame rating and/or a plenum flame rating. In addition, the optical-fiber interconnect cable 10 may itself have a riser rating with respect to cable fire resistance.

The outer jacket 15 typically possesses a circular cross section. That said, it is within the scope of the present invention to employ an outer jacket possessing non-circular shapes (e.g., an oval or a trapezoidal cross-section) or even somewhat irregular shapes.

The outer diameter of the outer jacket 15 is typically less than about 5 millimeters (e.g., about 4.8 millimeters). In one embodiment, the outer jacket 15 has an outer diameter of about 4 millimeters. In other embodiments, the outer jacket 15 has an outer diameter of less than 4 millimeters (e.g., 3.7 millimeters), such as less than 3.5 millimeters (e.g., 3.0 millimeters or less).

The optical-fiber interconnect cable 10 may be pre-connectorized for final use. For instance, a specific length of the cable includes a connector at each of its ends. Each connector typically includes one or more mechanical interference features that ensure proper polarization and alignment of all connections, thereby ensuring that no damage occurs to the optical connections or the electrical connections during insertion and removal of the connector. Each connector typically includes an upstream element and a downstream element (e.g., USB-like features). In addition, the connector may include stress-relief elements designed to prevent kinking at the connector-cable interface that could damage optical fibers or electrical conductors.

To supplement the present disclosure, this application incorporates entirely by reference the following patents and patent application publications, which relate to cable connectors: U.S. Pat. No. 7,537,489; U.S. Pat. No. 7,749,028; U.S. Pat. No. 7,794,284; U.S. Pat. No. 7,798,726; U.S. Pat. No. 7,841,904; U.S. Patent Application Publication No. US2010/0080519 A1; U.S. Patent Application Publication No. US2010/0124395 A1; U.S. Patent Application Publication No. US2010/0158448 A1; U.S. Patent Application Publication No. US2010/0226612 A1; U.S. Patent Application Publication No. US2010/0254661 A1; U.S. Patent Application Publication No. US2010/0254662 A1; U.S. Patent Application Publication No. US2010/0278490 A1; U.S. Patent Application Publication No. US2010/0290743 A1; U.S. Patent Application Publication No. US2010/0290745 A1; U.S. Patent Application Publication No. US2010/0303420 A1; U.S. Patent Application Publication No. US2011/0013872 A1; U.S. Patent Application Publication No. US2011/0044592 A1; U.S. Patent Application Publication No. US2011/0085766 A1; U.S. Patent Application Publication No. US2011/0091160 A1; U.S. Patent Application Publication No. US2011/0091161 A1; U.S. Patent Application Publication No. US2011/0097040 A1; U.S. Patent Application Publication No. US2011/0097041 A1; U.S. Patent Application Publication No. US2011/0097042 A1; U.S. Patent Application Publication No. US2011/0097043 A1; U.S. Patent Application Publication No. US2011/0103752 A1; U.S. Patent Application Publication No. US2011/0123144 A1; U.S. Patent Application Publication No. US2011/0142399 A1; U.S. Patent Application Publication No. US2011/0142400 A1; U.S. Patent Application Publication No.

US2011/0150397 A1; International Publication No. WO 01/80025 A1; International Publication No. WO 2008/121731 A1; and International Publication No. WO 2011/034544 A1.

An optical-fiber interconnect cable in accordance with the present invention may be subjected to a pinch test as depicted in FIG. 3. During the pinch test an interconnect cable is folded over itself so that the two cable portions on either side of the fold are substantially parallel to one another, thereby creating a pinch in the interconnect cable. The resulting folded cable has a maximum diameter of about twice the cable's normal diameter. At the pinch point, the cable is flattened and has a diameter less than its normal diameter. Although the cable has a reduced diameter at and near the pinch point, the remainder of the cable retains its normal diameter. The cable is held in this pinched state for about 10 minutes. After 10 minutes have elapsed and while the cable is held in the pinched state, the attenuation of the optical fibers in the cable is measured (e.g., at room temperature).

The pinch test has been performed on an interconnect cable having an outer diameter of 4.8 millimeters and an inner diameter of 3.1 millimeters. The cable jacket was formed from ECCOH® 5924 HFFR compound. The cable included a flextube formed from Santoprene® 201-87 thermoplastic elastomer, which had an outer diameter of 0.9 millimeter and an inner diameter of 0.65 millimeter. The interconnect cable was folded over itself in a steel tube having an inner diameter of about 10 millimeters. At the pinch point, the cable had a diameter of about 3.2 millimeters. At the conclusion of the pinch test, the interconnect cable was straightened and returned to its original dimension with no cable discoloration, cable damage, or fiber damage.

One tested interconnect cable included 80-micron core multimode optical fibers lacking a trench. At a wavelength of 850 nanometers, these trench-free multimode optical fibers have macrobending losses of (i) no more than 0.5 dB for a winding of two turns around a spool with a bending radius of 15 millimeters and (ii) no more than 1.0 dB for a winding of two turns around a spool with a bending radius of 7.5 millimeters. During the pinch test, these trench-free multimode optical fibers contained within this interconnect cable experienced attenuation added losses of about 0.518 dB at a wavelength of 850 nanometers.

Another tested interconnect cable included trench-assisted multimode optical fibers having an 80-micron core (e.g., as disclosed in commonly assigned U.S. Patent Application No. 61/511,672). At a wavelength of 850 nanometers, these trench-assisted multimode optical fibers have macrobending losses of (i) no more than 0.3 dB for a winding of two turns around a spool with a bending radius of 5 millimeters and/or (ii) no more than 0.5 dB for a winding of one turn around a spool with a bending radius of 3 millimeters. During the pinch test, these trench-assisted multimode optical fibers contained within this interconnect cable experienced attenuation added losses of about 0.227 dB at 850 nanometers.

Accordingly, during the pinch test the present interconnect cables typically have attenuation added losses of less than about 0.5 dB, more typically less than about 0.3 dB (e.g., less than about 0.25 dB).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Pat. No. 8,055,111 for a Dispersion-Shifted Optical Fiber (Sillard et al.); U.S. Pat. No. 8,041,172 for a Transmission Optical Fiber Having Large Effective Area (Sillard et al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Pat. No. 7,995,888 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burow et al.); U.S. Pat. No. 8,009,950 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. Patent Application Publication No. US2011/0116160 A1 for a Rare-Earth-Doped Optical Fiber Having Small Numerical Aperture, filed Nov. 11, 2010, (Boivin et al.); U.S. Patent Application Publication No. US2011/0123161 A1 for a High-Bandwidth, Multimode Optical Fiber with Reduced Cladding Effect, filed Nov. 24, 2010, (Molin et al.); U.S. Patent Application Publication No. US2011/0123162 A1 for a High-Bandwidth, Dual-Trench-Assisted Multimode Optical Fiber, filed Nov. 24, 2010, (Molin et al.); U.S. Patent Application Publication No. US2011/0135262 A1 for a Multimode Optical Fiber with Low Bending Losses and Reduced Cladding Effect, filed Dec. 3, 2010, (Molin et al.); U.S. Patent Application Publication No. US2011/0135263 A1 for a High-Bandwidth Multimode Optical Fiber Having Reduced Bending Losses, filed Dec. 3, 2010, (Molin et al.); U.S. Patent Application Publication No. US2011/0188826 A1 for a Non-Zero Dispersion Shifted Optical Fiber Having a Large Effective Area, filed Jan. 31, 2011, (Sillard et al.); U.S. Patent Application Publication No. US2011/0188823 A1 for a Non-Zero Dispersion Shifted Optical Fiber Having a Short Cutoff Wavelength, filed Jan. 31, 2011, (Sillard et al.); U.S. Patent Application Publication No. 2011/0217012 A1 for a Broad-Bandwidth Multimode Optical Fiber Having Reduced Bending Losses, filed Mar. 1, 2011, (Bigot-Astruc et al.); U.S. Patent Application Publication No. 2011/0229101 A1 for a Single-Mode Optical Fiber, filed Mar. 15, 2011, (de Montmorillon et al.); U.S. patent application Ser. No. 13/175,181 for a Single-Mode Optical Fiber, filed Jul. 1, 2011, (Bigot-Astruc et al.); U.S. patent application Ser. No. 13/206,943 for a Method of Fabricating an Optical Fiber Preform, filed Aug. 10, 2011, (de Montmorillon et al.); U.S. patent application Ser. No. 13/275,921 for a Multimode Optical Fiber Insensitive to Bending Losses, filed Oct. 18, 2011, (Molin et al.); U.S. patent application Ser. No. 13/303,967 for a Radiation-Insensitive Optical Fiber Doped with Rare Earths, filed Nov. 23, 2011, (Burow et al.); and U.S. patent application Ser. No. 13/315,712 for a Rare-Earth-Doped Optical Fiber, filed Dec. 9, 2011, (Boivin et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Pat. No. 7,974,507 A1 for a High-Fiber-Density Optical Fiber Cable (Louie et al.); U.S. Pat. No. 7,970,247 for a Buffer Tubes for Mid-Span Storage (Barker); U.S. Pat. No. 8,081,853 for Single-Fiber Drop Cables for MDU Deployments, filed Nov. 9, 2009, (Overton); U.S. Pat. No. 8,041,167 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Pat. No. 8,041,168 for Reduced-Diameter Ribbon Cables with High-Performance Optical Fiber, filed Nov. 10, 2009, (Overton); U.S. Pat. No. 8,031,997 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Application Publication No. 2011/0069932 A1 for a High-Fiber-Density Optical-Fiber Cable, filed Oct. 19, 2010, (Overton et al.); U.S. Patent Application Publication No. 2011/0091171 A1 for an Optical-Fiber Cable Having High Fiber Count and High Fiber Density, filed Oct. 19, 2010, (Tatat et al.); U.S. Patent Application Publication No. 2011/0176782 A1 for a Water-Soluble Water-Blocking Element, filed Jan. 19, 2011, (Parris); U.S. Patent Application Publication No. 2011/0268400 A1 for a Data-Center Cable, filed Apr. 28, 2011, (Louie et al.); U.S. Patent Application Publication No. 2011/0268398 A1 for a Bundled Fiber Optic Cables, filed May 3, 2011, (Quinn et al.); U.S. Patent Application Publication No. 2011/0287195 A1 for a Curing Apparatus Employing Angled UVLEDs, filed May 19, 2011, (Molin); U.S. Patent Application Publication No. 2012/0009358 for a Curing Apparatus Having UV Sources That Emit Differing Ranges of UV Radiation, filed Jun. 3, 2011, (Gharbi et al.); U.S. Patent Application Publication No. 2012/0014652 A1 for a Adhesively Coupled Optical Fibers and Enclosing Tape, filed Jul. 13, 2011, (Parris); U.S. patent application Ser. No. 13/206,601 for a Method and Apparatus Providing Increased UVLED Intensity, filed Aug. 10, 2011, (Overton); U.S. patent application Ser. No. 13/222,329 for an Optical-Fiber Module Having Improved Accessibility, filed Aug. 31, 2011, (Tatat); U.S. patent application Ser. No. 13/362,357 for a Broad-Bandwidth Optical Fiber, filed Jan. 31, 2012, (Molin et al.); and U.S. patent application Ser. No. 13/362,395 for a Multimode Optical Fiber, filed Jan. 31, 2012, (Molin et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber interconnect cable, comprising:
   a flexible subunit, said flexible subunit comprising one or more optical fibers enclosed within a flexible polymeric tube, wherein (i), in accordance with the pinch test, at least one of said one or more optical fibers has attenuation added losses of less than 0.5 dB at 850 nanometers and (ii) said flexible polymeric tube has a Young's modulus at 25° C. of less than about 300 MPa;
   one or more high-conductivity conductors; and
   an outer jacket surrounding said flexible subunit and said high-conductivity conductors.

2. The optical-fiber interconnect cable according to claim 1, wherein said flexible subunit comprises a plurality of multimode optical fibers.

3. The optical-fiber interconnect cable according to claim 1, wherein said flexible subunit comprises a plurality of bend-insensitive multimode optical fibers.

4. The optical-fiber interconnect cable according to claim 3, wherein, for two turns around a bending radius of 15 millimeters, said bend-insensitive multimode optical fibers have macrobending losses of (i) 0.1 dB or less at a wavelength of 850 nanometers and (ii) 0.3 dB or less at a wavelength of 1300 nanometers.

5. The optical-fiber interconnect cable according to claim 3, wherein, in accordance with the pinch test, said bend-insensitive multimode optical fibers have attenuation added losses of less than 0.3 dB at 850 nanometers.

6. The optical-fiber interconnect cable according to claim 1, wherein said flexible subunit comprises a plurality of trench-assisted multimode optical fibers having a core diameter of about 80 microns.

7. The optical-fiber interconnect cable according to claim 6, wherein, in accordance with the pinch test, said trench-assisted multimode optical fibers have attenuation added losses of less than 0.5 dB at 850 nanometers.

8. The optical-fiber interconnect cable according to claim 6, wherein, in accordance with the pinch test, said trench-assisted multimode optical fibers have attenuation added losses of less than 0.25 dB at 850 nanometers.

9. The optical-fiber interconnect cable according to claim 1, wherein said flexible polymeric tube has an outer diameter of less than about one millimeter.

10. The optical-fiber interconnect cable according to claim 1, comprising a strength member positioned within said outer jacket.

11. The optical-fiber interconnect cable according to claim 10, wherein said strength member comprises aramid yarns (i) surrounding said flexible subunit and said high-conductivity conductors and (ii) substantially filling the remaining central space defined by said outer jacket.

12. The optical-fiber interconnect cable according to claim 1, wherein said outer jacket comprises a halogen-free, flame-retardant compound.

13. The optical-fiber interconnect cable according to claim 1, wherein said outer jacket has VW-1 fire resistance in accordance with the UL VW-1 Vertical-Wire Flame Test (UL 1581).

14. The optical-fiber interconnect cable according to claim 1, wherein said outer jacket has an outer diameter of less than about 5 millimeters.

15. The optical-fiber interconnect cable according to claim 1, comprising a connector with stress relief at the connector-cable interface.

16. The optical-fiber interconnect cable according to claim 1, comprising a connector that includes a mechanical interference device to facilitate reliable insertion and removal without damage to either said optical conductors or said high-conductivity conductors.

17. The optical-fiber interconnect cable according to claim 1, wherein a specific length of the cable is pre-connectorized.

18. The optical-fiber interconnect cable according to claim 1, wherein said flexible polymeric tube has a Young's modulus at 25° C. of less than about 200 MPa.

19. The optical-fiber interconnect cable according to claim 1, wherein said flexible polymeric tube has a Young's modulus at 25° C. of between about 25 MPa and 75 MPa.

20. The optical-fiber interconnect cable according to claim 1, wherein said flexible polymeric tube has a Young's modulus at 25° C. of between about 20 MPa and 40 MPa.

21. The optical-fiber interconnect cable according to claim 1, wherein said outer jacket has a Young's modulus at 25° C. of less than about 150 MPa.

22. The optical-fiber interconnect cable according to claim 1, wherein said outer jacket has a Young's modulus at 25° C. of less than about 80 MPa.

23. An optical-fiber interconnect cable, comprising:
an outer jacket surrounding a dry filled core, the dry filled core including (i) a plurality of trench-assisted multimode optical fibers enclosed within a flextube having a Young's modulus at 25° C. of less than about 300 MPa, (ii) a plurality of electrical conductors, and (iii) strength yarns substantially filling the remaining free space within the outer jacket;
wherein each of said trench-assisted multimode optical fibers has a core diameter of about 80 microns; and
wherein, in accordance with the pinch test, said trench-assisted multimode optical fibers have attenuation added losses of less than 0.5 dB at 850 nanometers.

24. The optical-fiber interconnect cable according to claim 23, wherein, in accordance with the pinch test, said trench-assisted multimode optical fibers have attenuation added losses of less than 0.3 dB at 850 nanometers.

25. The optical-fiber interconnect cable according to claim 23, wherein, in accordance with the pinch test, said trench-assisted multimode optical fibers have attenuation added losses of less than 0.25 dB at 850 nanometers.

* * * * *